United States Patent Office 2,698,772
Patented Jan. 4, 1955

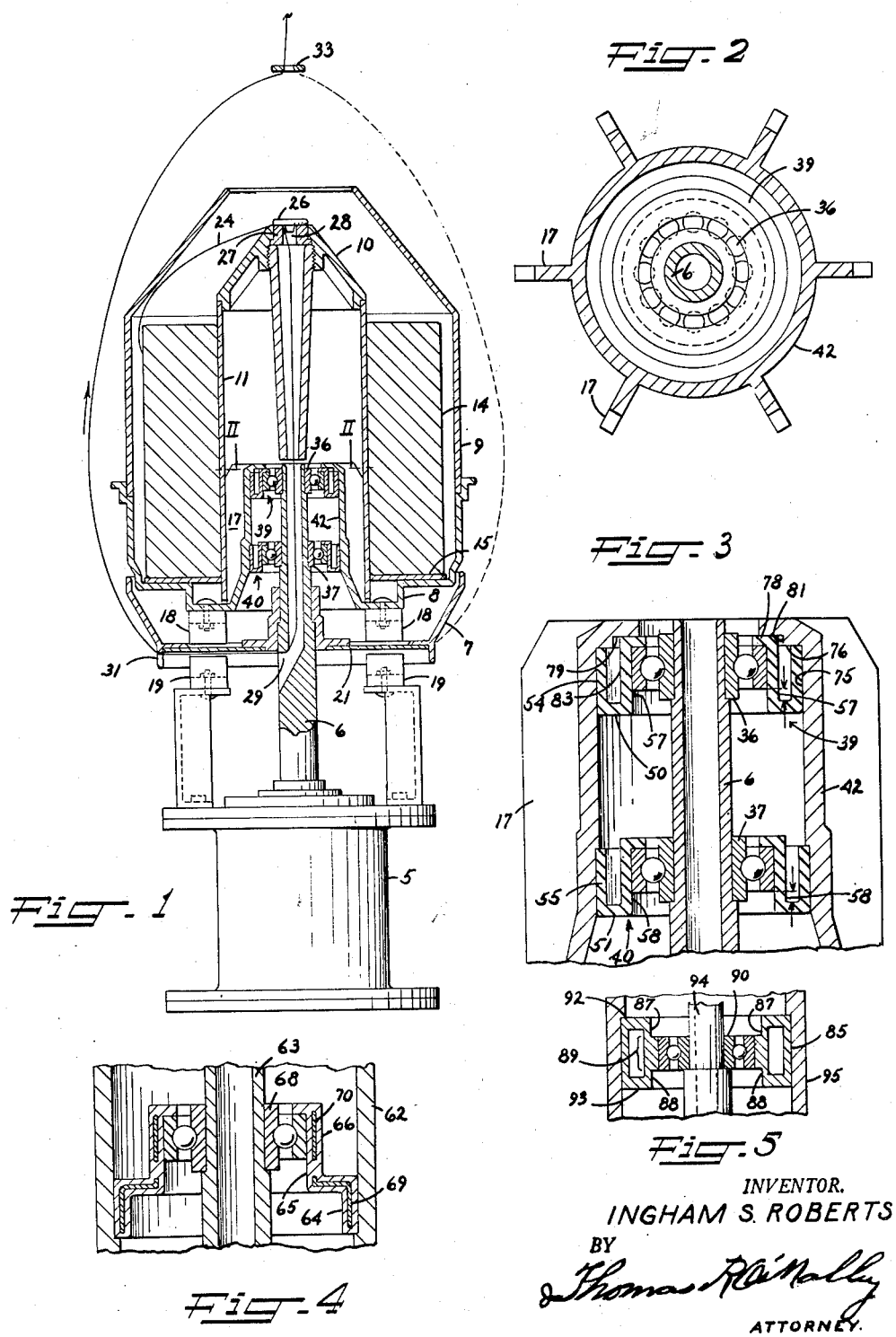

2,698,772
TWISTER MOUNTING

Ingham S. Roberts, Ridley Park, Pa., assignor to American Viscose Corporation, Wilmington, Del., a corporation of Delaware Application April 27, 1950, Serial No. 158,391

5 Claims. (Cl. 308—26)

This invention relates to vibration dampening mountings which are especially useful for strand twisters of the two-for-one type although they may be readily used in other types of equipment for dampening relative vibratory movement between members in concentric relationship.

An object of the invention is to provide an annular resilient mounting member of rubber or rubber-like material (herein generically referred to as an elastomeric material) which does not acquire appreciable permanent deformation as a result of normal service. It is another object to provide a resilient and flexible vibration dampening support of great durability between the concentric members. It is furthermore an object to provide a resilient mounting which is so constructed that the rubber or other resilient material of a narrow section thereof is stressed in shear by lateral movement between the concentric members, it being a well known characteristic of rubber, that when subjected to reversing shear stresses, vibrations are dampened more rapidly and completely than when the material is subjected to tension or compression stresses. It is also an object to provide a softly resilient vibration dampening mounting for use in a two-for-one twister so that the package holder thereof may be supported while being subjected to a minimum transmission of vibration from the spindle shaft. A readily yieldable mounting is particularly desirable in a two-for-one twister so as to reduce as much as possible the vibratory movement of the package support and the effect thereof on the application of pressure to yarn by members of a tensioning device mounted on the package or the package support. Other objects, features and advantages will be apparent from the following description of the invention and the drawing relating thereto in which Fig. 1 is an elevation partly in section of a two-for-one twister of a conventional type, the construction of which includes a mounting in accordance with the present invention;

Fig. 2 is a fragmentary sectional view of the apparatus of Fig. 1 taken along line II—II;

Fig. 3 is an enlarged fragmentary section taken from Fig. 1 to better illustrate the construction of the mountings;

Fig. 4 illustrates in section a modified mounting; and

Fig. 5 illustrates in section another embodiment of the invention.

In brief, the mounting of the invention comprises an annular bushing for absorbing vibratory motion between concentric members and comprising a rim section for engagement with the outer of the concentric members, a hub section for engagement with the inner member, an end section joining adjacent ends of the rim and hub sections, said hub section having a flexibly resilient portion free of engagement with the inner member and extending between it and the end section to provide thereby a shear section between axially spaced planes which are substantially parallel and very close together.

Fig. 1 illustrates partly in section, a two-for-one twister which comprises, as principal parts, a motor 5, spindle shaft 6, a flyer 7 attached to the shaft, a package holder 8 rotatably supported by the shaft 6, a cover 9 for the package holder, and a yarn tensioning and guiding device 10 supported by a package core 11. A strand package 14 of which the core 11 is a portion, rests upon an annular felt piece 15 positioned on the seating surface of the package holder. The package is centered with respect to the holder 8 by radial fins 17 (also illustrated in Fig. 2).

In normal operation, speeds of the shaft 6 and the flyer 7 range in various installations from approximately 6,000 to 20,000 revolutions per minute. The package holder 8 is restrained from rotating by the magnetic relationship between magnets 18, secured to a bottom surface thereof just above the non-magnetic disc element 21 of the flyer at equal distances from the shaft axis, and stationary magnets 19 mounted just below the element 21. A strand 24 passes from the exterior of the package 14 between the elements 26, 27 of the tensioning device into and through the aperture 28 and downwardly into the bore of the shaft 6 through a radial aperture 29 of the shaft and radially outwardly through the eye 31 of the flyer and upwardly through a balloon in the strand and through a guide 33 to a take-up means (not shown). Any slight eccentricity or lack of balance in the weight distribution of the shaft and the flyer with respect to their geometric axis causes the flyer and the shaft to rotate with the geometric axis traveling around the actual axis of rotation. A vibration is thus set up in a direction normal to the axis of rotation. Such vibrations may be transmitted to the package holder to produce erratic control of the tension in the yarn 24 by shaking the tension device, particularly the loosely supported member 26 thereof. However, transmission of vibration from the shaft to the package holder may be greatly reduced by absorbing the vibration in a mounting or annular spacer member fitting between the outer race of each bearing and the hub of the package support. As shown in Fig. 1, the package support 8 is rotatably mounted with respect to the roller bearings 36 and 37. The outer races of these bearings fit within a pair of bushings 39 and 40 which are secured within a hub member 42 of the package support.

The bushings 39 and 40 are similar and each is constructed so that the section which engages the inner member, i. e. the outer race of the bearing 36 or 37, in the example illustrated, extends beyond the bearing to form narrow annular portions 57 and 58 of inner axially-extending sections of bushings 39 and 40 (see section 83) having a width such as indicated by dimension arrows. The section portions 57 and 58 join with relatively non-yieldable end sections 50 and 51 which are joined also to annular axially extending sections 54 and 55, respectively, of the bushings which engage the hub portion 42 of the package support. The outer and inner surfaces of the portions 57 and 58 are free from contact with other apparatus structure such as shown so that they may function freely in shear to absorb vibratory motion. The shear sections or portions 57 and 58 are the only parts of the mountings 39 and 40 which deform to absorb vibration or deflection of the shaft relative to the package support. In order to place the material of the portions 57 and 58 in shear during movement of the shaft or the support in a direction normal to their axis, these portions, according to the invention, are restricted to a width such as indicated by the dimension arrows, no greater than the thickness of the sections in a radial direction. In the absence of vibrational force, the inner and outer walls of the mountings re-align themselves concentrically to bring the material of the portions 57 and 58 into an unstressed condition.

For this reason, the mountings do not acquire permanent deformation such as some of the known types of mountings in which vibration is absorbed by either compressing or extending a resilient material. For example, it is well known that articles comprising a rubber composition are permanently deformed after continuous service in compression or tension. Mountings such as described avoid a construction whereby the vibration-absorbing section is subjected to compression during vibration thereby providing freer movement of the shaft with respect to the package support.

As an additional feature of the invention, the mounting 39 of Fig. 1, shown in greater detail in Fig. 3, is constructed so that when the mounting is positioned with the outer wall 75 in contact with a shoulder at 76, an inwardly extending radial flange 78 of the mounting is positioned against the shoulder 79 of the hub member 42. The cylindrical surface at 81 which defines the outer diameter of the shoulder 79 is appreciably greater than the diameter of the outer surface 83 of the inner wall or section of the mounting. The cylindrical surface 81 therefore has a substantial clearance with the surface 83 and the flange 78 may move in frictional contact with the shoulder 79. The dampening action resulting from this arrangement for utilizing friction permits the construction of a lighter shear section in the mounting, thus obtaining the advantages of a "soft" mounting while avoiding vigorous rebound and oscillation effects attendant the use of stronger and heavier shear sections.

Fig. 4 illustrates a modified bushing or mounting in which the outer section 64 thereof in contact with an outer concentric member 62 is offset in a direction parallel to the axis of a rotating shaft 63 supported centrally of the mounting with respect to the section 66 of the mounting in contact with the outer race of a bearing 68. The mounting sections 64 and 66 are connected by a narrow shear section 65 which, in accordance with the invention absorbs vibratory movement of the shaft relative to the member 62. The sections 64 and 66 contain thin annular metallic elements 69 and 70 which impart greater rigidity and support to the outer and inner sections of the mounting, and confine the flexing of the mounting to the section 65. If desired, the metallic elements may be left out of the sections 64 and 66 and these sections fabricated from a harder and stiffer rubber composition.

Fig. 5 illustrates in section a modified bushing 85 of generally tubular cross-section in accordance with the invention. Annular shear sections 87 and 88 extend between the sections 89 in engagement with a bearing 90, and end sections 92 and 93 respectively. If desired, sections 89, 92 and 93 may be thicker, as shown, than the shear sections 87 and 88 to confine the absorption of vibration to the shear sections.

While preferred embodiments of the invention have been shown and described, it is to be understood that changes and variations may be made without departing from the spirit and scope of the invention as defined in the appended claims.

I claim:

1. In combination with two relatively movable members of which one is adapted to extend within the other lengthwise of an axis, a mounting for resiliently supporting the inner member of said members in generally concentric radially-spaced relation with the outer member with respect to the axis; the mounting comprising a bushing having an inner axially-extending section, an outer axially-extending section disposed in spaced normally coaxial relation with the inner section, and a generally annular radially-extending end section which extends between and connects one pair of adjacent ends of said axially-extending sections, the mounting having its radially inner surface in engaged circumferentially-extending relation with a radially outer surface of the inner member, and its radially exterior surface in engaged circumferentially-extending relation with a radially inner surface of the outer member; one of said axially-extending sections having a portion adjacent the end section with its radially outer surface and its radially inner surface exposed and free of other structure; said section portion being joined to the end section and comprising an elastically flexible material extending axially between two planes perpendicular to said axis and spaced a distance substantially no greater than the radial thickness of the material; the assembly comprising the member and the mounting also comprising means for supporting all of said sections of the bushing in a rigid condition except said section portion having free radially outer and inner surfaces whereby substantially all of the deformation of the bushing resulting from vibration of one member relative to the other in a direction transverse to the axis occurs solely within said section portion and the material thereof is subjected to primarily shear forces.

2. In combination with two relatively movable members of which one has an exterior circular surface adapted to extend lengthwise of an axis within an interior circular surface of the other member, a mounting for resiliently supporting the inner member of said members in generally concentric radially-spaced relation with the outer member and the axis; the mounting comprising a bushing having an inner axially-extending section of circular cross section, an outer axially-extending section of circular cross section disposed in spaced normally coaxial relation with the inner section, and a generally annular radially-extending end section which extends between and connects one pair of adjacent ends of said axially-extending sections; the mounting having a radially inner surface in engaged circumferentially-extending relation with a radially outer surface of the inner member, and a radially exterior surface in engaged circumferentially-extending relation with a radially inner surface of the outer member; one of said axially-extending sections having a portion adjacent the end section with its radially outer surface and its radially inner surface exposed and free of other structure; said section portion being joined to the end section and comprising an elastically flexible material extending axially between two planes perpendicular to said axis and spaced apart a distance substantially no greater than the radial thickness of the material; the assembly which comprises the member and the mounting also comprising means for supporting all of said sections of the bushing in a rigid condition except said section portion having free radially outer and inner surfaces whereby substantially all of the deformation of the bushing resulting from vibration of one member relative to the other in a direction transverse to the axis occurs solely within said section portion, and the material thereof is subject primarily to shear forces.

3. The combination as defined in claim 2 wherein the bushing comprises an elastomeric material with the sections thereof, except said section portion, comprising a relatively non-flexible hard composition of said material, and said section portion comprises a relatively flexible elastic composition of said material.

4. A combination as defined in claim 2 wherein the sections of the bushing, except said section portion, comprises thin annular metallic elements which impart rigidity and support to the sections except said section portion.

5. A combination as defined in claim 2 wherein one of the axially-extending sections of the bushing has an end surface at the end of the section not joined to said end section, and the member with respect to which the section having said end surface may vibrate has a radially-extending annular surface in frictional engagement with the end surface.

References Cited in the file of this patent

UNITED STATES PATENTS

| | | |
|---|---|---|
| 1,060,000 | Jorgensen | Apr. 29, 1913 |
| 1,639,684 | Bott | Aug. 23, 1927 |
| 1,798,596 | Fahrney | Mar. 31, 1931 |
| 1,828,546 | Sandstrom | Oct. 20, 1931 |
| 2,115,268 | Klein | Apr. 26, 1938 |
| 2,127,921 | Kent | Aug. 23, 1938 |
| 2,155,919 | Wooler et al. | Apr. 25, 1939 |
| 2,374,085 | Gwaltney et al. | Apr. 17, 1945 |
| 2,379,806 | Kent | July 3, 1945 |
| 2,494,815 | Jadoul | Jan. 17, 1950 |

FOREIGN PATENTS

| | | |
|---|---|---|
| 36,066 | Sweden | Sept. 17, 1912 |